United States Patent [19]
Miura et al.

[11] Patent Number: 5,315,570
[45] Date of Patent: May 24, 1994

[54] OPTICAL DISK REPRODUCING APPARATUS WHICH AUTOMATICALLY DETERMINES THE FORMAT TYPE OF THE OPTICAL DISK

[75] Inventors: Yoshihiro Miura, Tokyo; Koji Takagi, Kanagawa, both of Japan

[73] Assignee: Sony Corporation, Tokyo, Japan

[21] Appl. No.: 33,412

[22] Filed: Mar. 18, 1993

Related U.S. Application Data

[63] Continuation of Ser. No. 638,848, Jan. 8, 1991, abandoned.

[30] Foreign Application Priority Data

Jan. 9, 1990 [JP] Japan .................. 2-002151

[51] Int. Cl.⁵ .............................. G11B 7/00
[52] U.S. Cl. ........................ 369/48; 369/54; 369/58; 369/124; 369/59
[58] Field of Search ............ 369/48, 47, 49, 54, 369/58, 32, 124, 43, 59, 53

[56] References Cited

U.S. PATENT DOCUMENTS

| | | | |
|---|---|---|---|
| 4,800,550 | 1/1989 | Yamauchi | 369/59 |
| 4,858,031 | 8/1989 | Fukuta | 358/342 |
| 4,870,515 | 9/1989 | Stokes | 360/72.2 |
| 4,885,644 | 12/1989 | Ishii et al. | 358/342 |
| 4,916,682 | 4/1990 | Tomoda et al. | 369/58 |
| 4,916,685 | 4/1990 | Endoh et al. | 369/47 |
| 5,068,842 | 11/1991 | Naito | 360/48 |

FOREIGN PATENT DOCUMENTS

| | | |
|---|---|---|
| 0081958A1 | 6/1983 | European Pat. Off. . |
| 0165320 | 11/1984 | European Pat. Off. . |
| 0149101A1 | 7/1985 | European Pat. Off. . |
| 0270215 | 9/1987 | European Pat. Off. . |
| 3821355A1 | 12/1989 | Fed. Rep. of Germany . |
| 1294276 | 2/1990 | Japan . |

Primary Examiner—W. R. Young
Assistant Examiner—Muhammad N. Edun
Attorney, Agent, or Firm—Philip M. Shaw, Jr.

[57] ABSTRACT

A reproducing apparatus for a disc in which data recorded on an optical disc are read out by an optical pickup and reproduced, is disclosed. Before start of reproduction, it is determined if the disc loaded into the apparatus is a data disc on which information data such as letter or character data or picture data are recorded, or an audio disc on which audio signals are recorded, and the playback mode is automatically selected as a function of the type of the optical disc loaded into the apparatus. At the start time of the reproducing operation from the disc, the type discriminating data recorded on the disc are read out and, as a function of the contents of the type discriminating data, switching is made automatically between the data reproducing operation and the audio signal reproducing operation, while the type of the optical disc is displayed on the display section on the basis of the type discriminating data.

10 Claims, 10 Drawing Sheets

| FRAME | | | | | | | | |
|---|---|---|---|---|---|---|---|---|
| 0 | | | | $S_0$ | | | | |
| 1 | | | | $S_1$ | | | | |
| 2 | $P_1$ | $Q_1$ | $R_1$ | $S_1$ | $T_1$ | $U_1$ | $V_1$ | $W_1$ |
| 3 | $P_2$ | $Q_2$ | $R_2$ | $S_2$ | $T_2$ | $U_2$ | $V_2$ | $W_2$ |
| ... | | | | | | | | |
| 94 | $P_{93}$ | $Q_{93}$ | $R_{93}$ | $S_{93}$ | $T_{93}$ | $U_{93}$ | $V_{93}$ | $W_{93}$ |
| 95 | $P_{94}$ | $Q_{94}$ | $R_{94}$ | $S_{94}$ | $T_{94}$ | $U_{94}$ | $V_{94}$ | $W_{94}$ |
| 96 | $P_{95}$ | $Q_{95}$ | $R_{95}$ | $S_{95}$ | $T_{95}$ | $U_{95}$ | $V_{95}$ | $W_{95}$ |
| 97 | $P_{96}$ | $Q_{96}$ | $R_{96}$ | $S_{96}$ | $T_{96}$ | $U_{96}$ | $V_{96}$ | $W_{96}$ |
| 0 | | | | $S_0$ | | | | |
| 1 | | | | $S_1$ | | | | |
| 2 | $P_1$ | $Q_1$ | $R_1$ | $S_1$ | $T_1$ | $U_1$ | $V_1$ | $W_1$ |
| 3 | $P_2$ | $Q_2$ | $R_2$ | $S_2$ | $T_2$ | $U_2$ | $V_2$ | $W_2$ |
| ... | | | | | | | | |

$S_0 = 0010000000001$
$S_1 = 0000000010010$
(OUT-OF-RULE OF EFM)

FIG. 2

| $Q_1 \sim Q_4$ | $Q_5 \sim Q_8$ | $Q_9\ Q_{10} \cdots Q_{79}\ Q_{80}$ | $Q_{81} \sim Q_{96}$ |
|---|---|---|---|
| 4 CONTROL BITS | 4 ADDRESS BITS | 72 DATA BITS | 16 CRC BITS |

FIG. 3

| NUMBER OF MUSICAL MOVEMENT TNO 00 | POINT | MIN 00~74 | FRAME NUMBER SEC 00~59 | FRAME 00~74 | PMIN 00~74 | PSEC 00~59 | FRAME NUMBER PFRAME 00~74 |
|---|---|---|---|---|---|---|---|
| | | TIME ELAPSED IN MUSICAL MOVEMENT | | | ABSOLUTE TIME OF POINT CONTENTS | | |

FIG. 4

| SUB-CODING FRAME NUMBER IN LEAD-IN | POINT | PMIN, PSEC, PFRAME |
|---|---|---|
| n | 01 | 00, 02, 40 |
| n+1 | 01 | 00, 02, 40 |
| n+2 | 01 | 00, 02, 40 |
| n+3 | 02 | 20, 05, 35 |
| n+4 | 02 | 20, 05, 35 |
| n+5 | 02 | 20, 05, 35 |
| n+6 | 03 | 50, 20, 50 |
| n+7 | 03 | 50, 20, 50 |
| n+8 | 03 | 50, 20, 50 |
| n+9 | A0 | 01, 00, 00 |
| n+10 | A0 | 01, 00, 00 |
| n+11 | A0 | 01, 00, 00 |
| n+12 | A1 | 03, 00, 00 |
| n+13 | A1 | 03, 00, 00 |
| n+14 | A1 | 03, 00, 00 |
| n+15 | A2 | 55, 15, 05 |
| n+16 | A2 | 55, 15, 05 |
| n+17 | A2 | 55, 15, 05 |
| n+18 | 01 | 00, 02, 40 |
| n+19 | 01 | 00, 02, 40 |
| n+20 | 01 | 00, 02, 40 |
| n+21 | 02 | 20, 05, 35 |

FIG. 5

OPTICAL DISK REPRODUCING APPARATUS WHICH AUTOMATICALLY DETERMINES THE FORMAT TYPE OF THE OPTICAL DISK

This is a continuation application of co-pending application Ser. No. 07/638,848 filed on Jan. 8, 1991, now abandoned.

BACKGROUND OF THE INVENTION

1. Field of the Invention

This invention relates to a reproducing apparatus for a disc in which optical discs having different information data recorded thereon, such as a data disc on which letter or character data or picture data, such as Japanese dictionary data, English-Japanese dictionary data or encyclopedia data, are recorded, or an audio disc on which audio signals are recorded may be reproduced selectively. More particularly, it relates to a reproducing apparatus for a disc in which it is determined if the optical disc loaded in the reproducing apparatus is a data disc or an audio disc and in which the reproducing operation may be switched automatically between the data disc reproducing operation and the audio disc reproducing operation depending on the type of the loaded optical disc.

2. Description of the Prior Art

Among the discs on which information data are pre-recorded, there are a data disc on which letter or character data or picture data, such as Japanese dictionary data, English-Japanese dictionary data or encyclopedia data are recorded, and an audio disc, on which audio signals are recorded.

There is proposed a reproducing apparatus for a disc which enables reproduction of an optical disc which may be a data disc or an audio disc. For reproducing a data disc by such a disc reproducing system, the letter or character data or the picture data recorded on the data disc are read out by an optical pickup and the read-out data are displayed as visual data on the display by way of performing a data reproducing operation. For reproducing an audio disc on which audio signals are recorded, the audio signals recorded on the audio disc are read out by an optical pickup and the read-out signal data are outputted as audio signals for driving a speaker by means of an audio processing circuit by way of performing an audio signal reproducing operation.

In this manner, the reproducing operation for information signals recorded on the optical disc differs as a function of whether the disc is a data disc or an audio disc.

Therefore, when reproducing the optical disc with the use of the above mentioned reproducing apparatus for a disc, it is grasped in advance whether the optical disc loaded in the system is the data disc or the audio disc and the operating mode is set as a function of the disc type before proceeding to reproduction.

With such reproducing system for a disc, since the reproducing mode is selected as a function of the optical disc to be loaded, that is, as a function of whether the disc is the data disc or the audio disc, should a mistake be made in the selection of the reproducing mode, it becomes impossible to reproduce data from the disc loaded in the system.

For example, when the operating mode is set to the audio disc reproducing operation, and the data disc is loaded by mistake, the data signals read from the optical disc are reproduced as though they were musical sound signals, so that, in a majority of cases, only the voice as the noise is reproduced. As a matter of course, the letter or character data recorded on the data disc cannot be displayed as visible data.

Conversely, when the operating mode is set to the data disc reproducing operation, and the audio disc is loaded by mistake, the information data such as letter or character data or picture data to be recorded on the data disc or the processing data for these information data cannot be read, so that the operation of reproducing the data read out by the optical pickup cannot be performed. For example, the operation of reproducing the data read out from the optical disc cannot be performed in succession to the data read-out operation. Should the user become aware of the error in loading the disc or in the setting of the operating mode and exchange the disc or the mode setting, it becomes possible to reproduce the desired optical disc. However, should the user not become aware of the error in loading the disc or in the setting of the operating mode, it may occur that the error be mistaken for a trouble in the disc reproducing system. There is also an inconvenience in that a laborsome operation is necessitated for exchanging the disc or re-setting the operating mode.

OBJECTS AND SUMMARY OF THE INVENTION

It is an object of the present invention to provide a reproducing apparatus for a disc for reading out data recorded on an optical disc by an optical pickup and reproducing the read-out data, in which, before starting the reproduction, it is determined if the loaded disc is the data disc or the audio disc and the reproducing mode is selected automatically as a function of the type of the disc loaded in the apparatus, that is as a function of whether the disc is a type of disc for letter or character data or a type of disc for audio signals.

It is another object of the present invention to provide a reproducing apparatus for a disc in which, when starting the reproducing operation, the type discriminating data recorded on the disc are read out, the reproducing operation is automatically switched between the data reproducing operation and the audio signal reproducing operation as a function of the type discriminating data, the disc type is displayed on the display section on the basis of the type discrimination data, the optical pickup is moved to a data record start portion on the disc when the type discriminating data indicate that the disc is the data disc, and the total record time as well as the number of errors are displayed on the display section when the type discriminating data indicates that the disc is the audio data, at the same time that the corresponding display is made on the display section.

It is a further object of the present invention to provide a reproducing apparatus in which the type discriminating data recorded on the disc are read on starting the disc reproducing operation and switching is made between the first and the second operating sections associated with the reproducing operations for these discs as a function of the contents of the type discriminating data.

It is a further object of the present invention to provide a reproducing apparatus for a disc in which data recorded on an optical disc and read out by the optical pickup are displayed in the display section and a cursor indicating the display data on the display section is moved by a pointing device to select the desired display data.

The above and other objects as well as the advantages of the present invention will become apparent from the following description especially when read in conjunction with the accompanying drawings.

BRIEF DESCRIPTION OF THE DRAWINGS

FIG. 2 is a diagrammatic view showing the format of a subcoding of an optical disc loaded in the reproducing apparatus for a disc according to the present invention.

FIG. 3 is a diagrammatic view showing the format of the Q-channel in the sub-coding of the optical disc.

FIG. 4 is a diagrammatic view showing the format of the contents of the data recorded on the optical disc.

FIG. 5 is a diagrammatic view showing the format of a point recorded on the optical disc.

DETAILED DESCRIPTION OF PREFERRED EMBODIMENTS

The reproducing apparatus for a disc according to the present invention is adapted for selectively reading out and reproducing a data disc on which information data including letter or character data such as Japanese dictionary data, English-Japanese dictionary data or encyclopedia data, are recorded, or an audio disc, on which audio signals are recorded.

Figure 1:
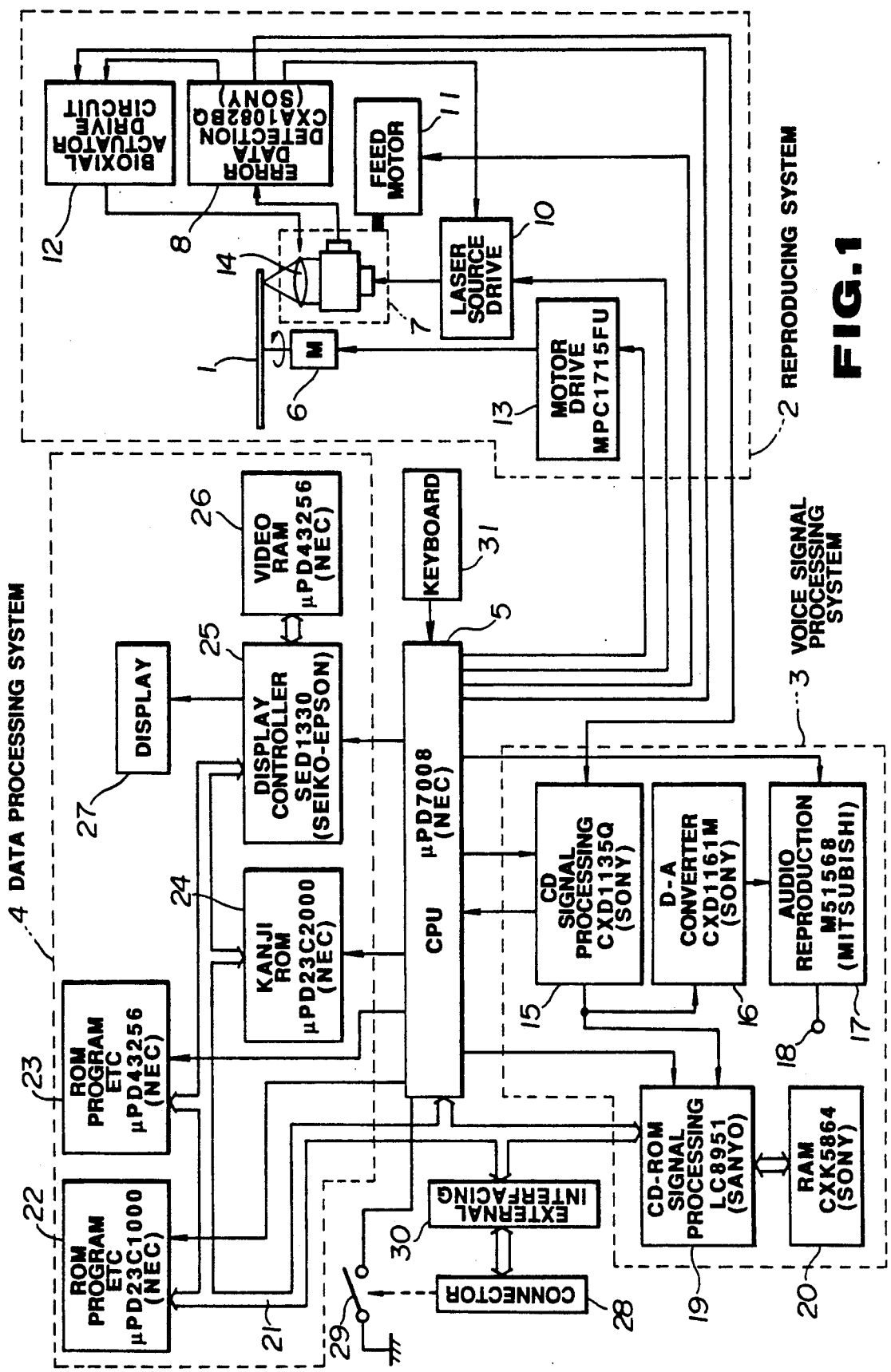
FIG. 1 is a block view showing a reproducing apparatus for a disc according to the present invention.

The reproducing apparatus for a disc is constructed as shown in FIG. 1, and is formed by a reproducing system 2 for reproducing data recorded on an optical disc 1, a voice signal processing system 3 for voice signal processing of the read-out data, and a data processing system 4 for retrieving the read-out data for image display. These systems 2 to 4 are controlled by a central processing unit (CPU) 5 which will be elucidated subsequently. As CPU 5, a CPU manufactured by NEC Corporation under trade name of µPD7008 may preferably be employed.

In the reproducing system 2, the CPU 5 is responsive to the input from a keyboard 31 to control a laser light source driving circuit 10, a thread feed motor 11, a biaxial actuator driving circuit 12 and a motor driving circuit 13. As the motor driving circuit 13, a device manufactured by Motorola Inc. under the trade name of MPC1715FU may preferably be employed The CPU 5 control the motor driving circuit 13 for rotationally driving a spindle motor 6 at, for example, a constant linear velocity (CLV) or at a constant angular velocity (CAV), while simultaneously controlling the thread feed motor 11 actuating an optical pickup 7 comprised of an objective lens 14 constituting a biaxial device, a light source, a photodetector, a cylindrical lens or the like, for roughly shifting the light spot of a laser beam to a predetermined track on the optical disc 1. The CPU also controls the biaxial actuator driving circuit 12 to shift the object lens 14 of the pickup 7 both in the direction along the optical axis of lens for focusing control and in the direction normal to the optical axis to shift the beam spot into register with the predetermined track on the optical disc 1 for tracking control by way of reproducing the data recorded oh the optical disc 1.

With the optical disc 1, data are recorded on recording tracks formed by spirally or concentrically extending pre-grooves or lands delimited between the adjoining pregrooves. On these recording tracks, frame sync signals, timing data, position data and data per se are recorded alternately in the track direction in accordance with, for example, the so-called CD (compact disc) format.

More specifically, each frame is constituted by frame sync signals of a pattern of two successive series of 11T transition intervals (out-of-rule pattern) which violates the modulation rule of the so-called eight-to-fourteen modulation (EFM), with T being a channel clock period in the CD format, followed by subcoding data as the timing or position data, including parity data.

The subcoding data also include out-of-rule patterns $S_0$ and $S_1$ whereby the leading end of a block can be discriminated. The subcoding data are constituted by 98 blocks, inclusive of 2 blocks of the out-of-rule patterns $S_0$ and $S_1$. The format for this subcoding is shown in FIG. 2.

FIG. 2 shows a block consisting of 96 bytes, with the patterns $S_0$, $S_1$ of the sync signals placed at the leading end, as described previously. Of these, $P_1$ to $P_{96}$ are used for accessing. The channel P simply indicates by "1" the region between data to be recorded, and is used for rough locating.

The channel Q allows for finer control. It is this channel Q which is mainly used for accessing to an arbitrary track.

FIG. 3 shows a format for bits $Q_1$ to $Q_{96}$.

In this figure, 4 "control" bits are used for identification of the numbers of audio channels, emphasis and digital data (CD-ROM). Thus the bits 0000 indicate 2-channel audio without preemphasis; the, bits 1000 indicate 4 channel audio without preemphasis; and the bits 0001 indicate 2-channel indicate 2-channel audio with preemphasis; the bits 1001 indicate 4-channel audio with preemphasis. The bits 0100 indicate a data track and that the 4 channels are currently not in use. A CD-ROM is denoted by a control bit code of 01*1, wherein * may be 0 or 1. A CD-ROM means an optical disc on which there are recorded letter or character data, such as Japanese dictionary data, english-Japanese dictionary data or encyclopedia data.

In accordance with the above format, a directory called the table of contents or TOC data are recorded in a lead-in region on the inner periphery of the disc. In general, the TOC data are read before reproduction to grasp the position information, the timing information, or the like recorded on the disc, to facilitate accessing to an arbitrary track.

The TOC data format is comprised of 72 bit data shown in FIG. 3, which are allotted to musical movement number, point, elapsed time in a musical movement (minutes, seconds and frame numbers), the absolute time of the contents of the point (minutes, seconds and frame numbers). The points and the contents of the points are as shown in FIG. 5.

The absolute time at which each musical movement indicated by the numbers with points 00 to 97 (FIG. 5).

When POINT is A0, PMIN indicates the number of the first musical movement.

PSEC=PFRAME=0

When POINT is A1, PMIN indicates the number of the last musical movement.

PSEC=PFRAME=0

When POINT is A2, PMIN, PSEC and PFRAME indicate the absolute time when readout is started. These contents are recorded three times each in the lead-in region.

The TOC data read out from the lead in region before reproduction are supplied to error detection-data detection circuit 8 shown in FIG. 1. As the error detection-data detection circuit 8, a device manufactured by Sony Corporation under the trade name of CXA1082BQ is preferably employed. This error detection data detection circuit 8 also detects a laser output error, a focusing error or a tracking error, in addition to the TOC error, and transmits the laser output error signal to laser light source driving circuit 10, while transmitting the focusing error signal and the tracking error signal to biaxial actuator driving circuit 12. The laser light source driving circuit 10 performs a control operation by the laser output error signal so that the power of the laser light irradiated on the surface of the disc 1 will be constant, whereas the biaxial actuator driving circuit 12 performs a control operation in such a manner that the object lens 14 is driven and displaced responsive to the focusing error signal and the tracking error signal to maintain focusing and tracking in the normal state to provide for accurate data readout.

On the other hand, the TOC data reproduced from the optical disc 1 are supplied via error detection-data detection circuit 8 to CD signal processing circuit 15 of the signal processing system 3. As the CD signal processing circuit 15, a device manufactured by Sony Corporation under the trade name of CXD1135Q is preferably employed. The software program or the like is recorded in ROM 22 and ROM 23 and, on the basis of the data read out in accordance with the program, the CPU 5 discriminates the type of the loaded disc to transmit the discrimination data to the CD signal processing circuit 15. The circuit 15 is responsive to the discrimination data supplied thereto to switch the signal processing systems.

That is, when the discrimination data that the loaded disc is the audio disc is supplied to the CD signal processing circuit 15, the circuit 15 transmits the audio data signals supplied thereto to D/A converter 10. As this D/A converter, a device manufactured by Sony Corporation under the trade name of CXD1161M, this D/A converter 16 converts the audio data signal supplied thereto into signals, which are supplied to audio reproducing circuit 17 so as to be converted into audio signals, which are transmitted at output terminal 18. As the audio reproducing circuit 17, a device manufactured by Mitsubishi Electric Corporation under the trade name of M51568 is preferably employed.

On the other hand, when the discrimination data that the loaded disc is the data disc, that is, the CD-ROM, is supplied to the CD signal processing circuit 15, the circuit 15 transmits character signals or the like supplied thereto to a CD-ROM signal processing circuit 19. As this CD-ROM signal processing circuit 19, a device manufactured by Sanyo Electric Co., Ltd. under the trade name of LC8951, is preferably employed. The character data signals supplied to the CD-ROM signal processing circuit 19 are read out responsive to signals supplied from CPU 5 via random access memory (RAM) 20 functioning as a transient storage memory. As the RAM 20, a device manufactured by Sony Corporation under the trade name of CXK5864 is preferably employed. The ROM 22 and the RAM 23, on which the program or the like is recorded, are connected to data bus 21. As the ROM 22, a device manufactured by NEC Corporation under the trade name of $\mu$PD23C100 is preferably employed and, as the RAM 23, a device manufactured by NEC Corporation under the trade name of $\mu$PD43256 is preferably employed. The read out signals, such as the character data, are transmitted over data bus 21. A display image is recorded and formed in video RAM 26 by a Kanji pattern or the like read out from Kanji ROM 24 in accordance with the character data signals. The display image in the video RAM 26 is read out by display controller 25 responsive to signals from CPU 5 so as to be displayed in a display section 27 such as a liquid crystal display (LCD) plate. As the Kanji ROM 24, a device manufactured by NEC Corporation under the trade name of $\mu$PD23C2000 is preferably employed. As the display controller 25, a device manufactured by Seiko Epson Inc. under the trade name of SED1330 is preferably employed and, as the video RAM 26, a device manufactured by NEC Corporation under the trade name of $\mu$PD43256, is preferably employed.

If an external interface is connected to a connector 28, a switch 29 is turned on to reset the CPU 5 as soon as the interface is in circuit so that signal processing is performed under the instructions from the interface. The instructions from the interface are processed by an external processing circuit 30 and the processed data are displayed on the display section 27 via data bus 21 as described in the foregoing.

With the above described reproducing apparatus 40, the portions of the reproducing apparatus for a disc which are used as a man-machine interface for data processing and display are not in need of strict timing processing and hence may be processed as the main routine, while the remaining operation may be performed by an interrupt routine, so that the signal processing in its entirety may be taken charge of by the sole CPU 5. Also, in consideration that software control is performed between the driving CPU of the present apparatus and the host CPU of a commercially available microcomputer system provided outside the present apparatus, the code system between the command packet and the status is utilized in the bus line system interconnecting these CPU5. When the present apparatus is desired to be controlled from an external host, the main routine on the drive CPU side of the present system is replaced by MALT commands so that the present system may be used by the host CPU only by starting the bus line control routine.

Figure 6:
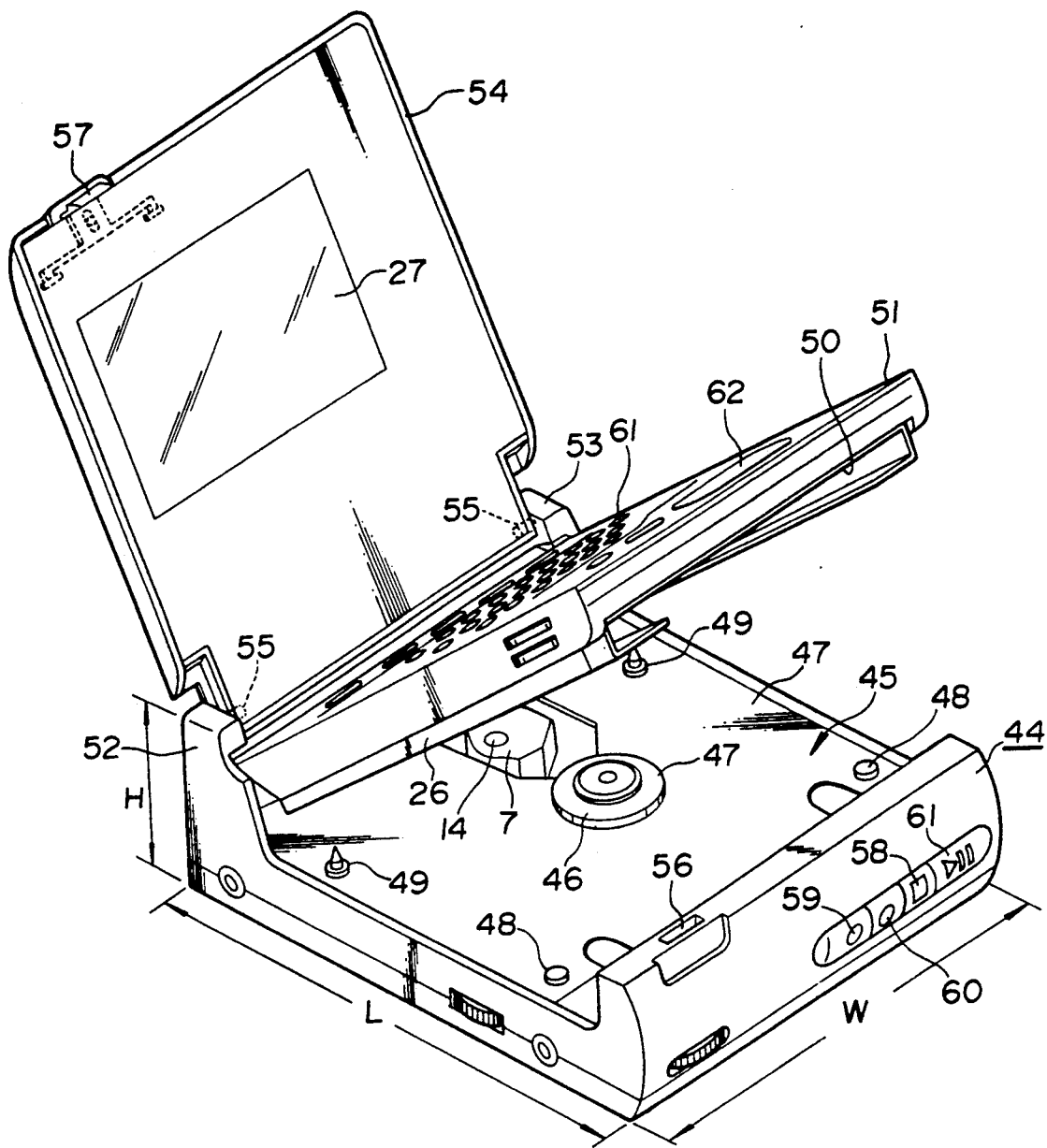
FIG. 6 is a perspective view of a reproducing apparatus according to the present invention, with the lid opened and with the cartridge holder having been rotated to the disc cartridge inserting and detaching position.
Figure 8:
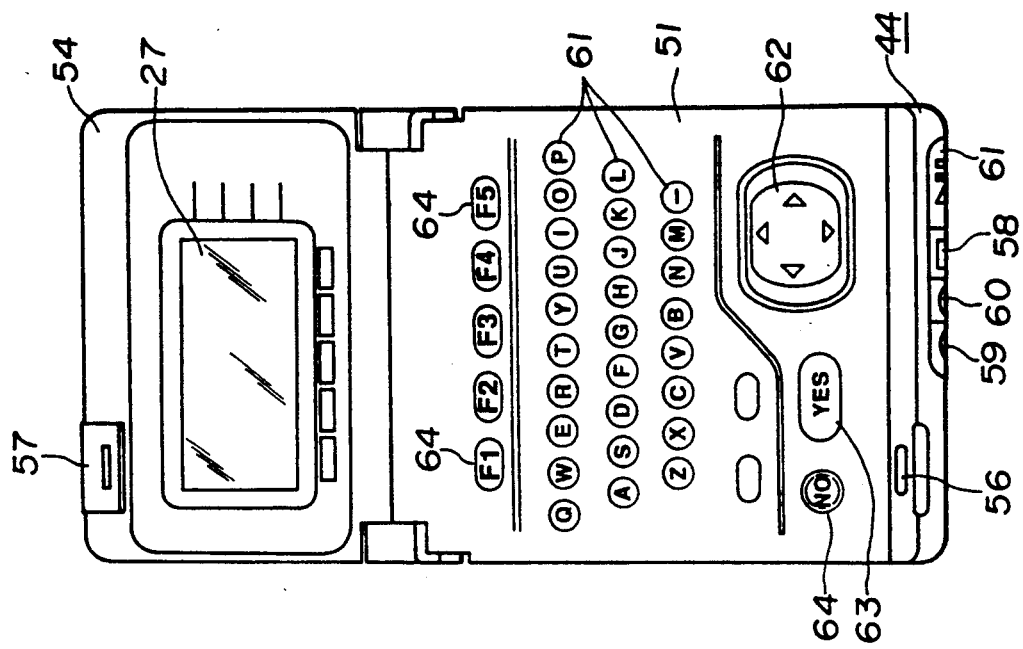
FIG. 8 is a plan view of the reproducing apparatus showing the display section and the key operating section with the lid opened.
Figure 7:
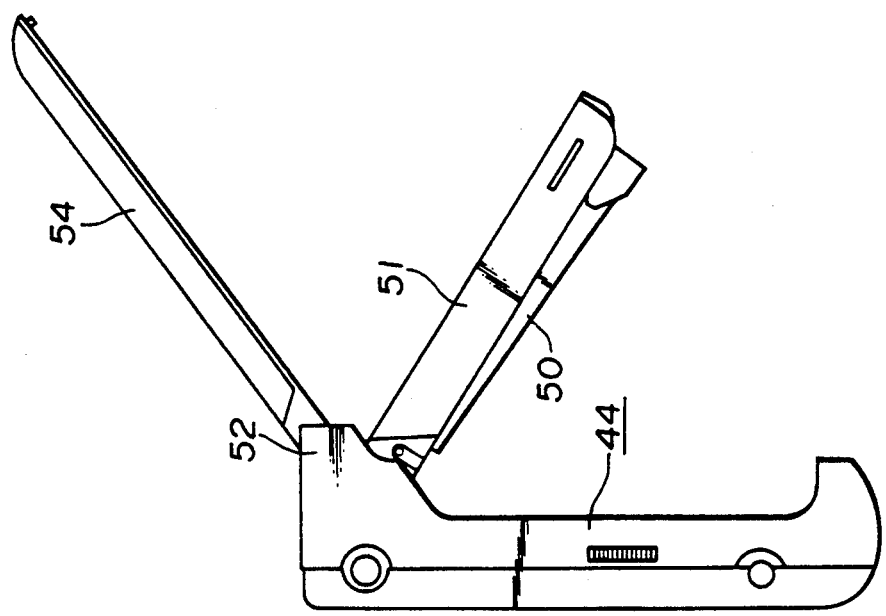
FIG. 7 is a side elevational view showing the reproducing apparatus for a disc.

The above described reproducing apparatus, provided with the function of an electronic dictionary and audio signal reproduction, is constructed as a unit by the construction shown in FIGS. 6, 7 and 8.

Referring to FIG. 6, the reproducing apparatus includes a main body 44, in the form of a regular parallelepiped, within which are disposed a reproducing system 2 for reading and reproducing information signals recorded on an optical disc 1, such as a data disc and an audio disc shown in FIG. 1, a CPU 5, a voice signal processing system 3 and a data processing system 4 excluding the display section 27 constituted by a display element such as LCD. As shown in FIG. 6, the main body 44 is of a size that can be placed on the palm of a hand and has a disc loading section 45 on its upper surface into which may be loaded a disc cartridge accommodating an optical disc 1 about 8 cm in diameter. Thus the main body 44 has a width W about equal to 105 mm, a length L about equal to 135 mm and a height H equal to 45 mm.

A disc rotating-driving device 47 including a disc table 46 rotationally driven by a spindle motor 6 constituting the reproducing system 2 is provided at the center of the disc loading section 45. An optical pickup 7 is movable mounted for scanning the signal recording area of the optical disc 1 mounted on the disc table 46. The disc rotating-driving device 47 and the optical pickup 7 are supported by a chassis base plate 47 covering the upper surface of the main body 44.

On the disc loading section 45, there are provided positioning pins 48, 48 and height setting pins 49, 49 for setting the positions of the disc cartridge loaded in the disc loading section 45 in both the horizontal and vertical positions.

On the main body 44, there is mounted a cartridge holder 50 for loading a disc cartridge to the disc loading section 45 by means of the chassis base plate 47. The cartridge holder 50 is supported by the chassis base plate 47 so as to be turned between a raised position laying the disc loading section 45 open to enable the disc cartridge to be introduced into the cartridge holder and a lower position covering the disc loading section 45.

On the main body 44, there is also mounted a keyboard cover 51 which is turned to follow the rotation of the cartridge holder 50. That is, the keyboard cover 51 is rotatably supported between cover mounting sections 52, 53. When the cartridge holder 50 is turned to the raised position, the keyboard cover 51 is turned to the raised position, along with the cartridge holder 50, as shown in FIG. 6 and, when the cartridge holder 50 is turned to the lower position covering the disc loading section 45, the keyboard cover 51 is lowered to cover the disc loading section 45, as shown in FIG. 8.

On the main body 44, a lid 54 covering the upper surface of the main body 44 and the keyboard cover 51 is rotatably mounted by a supporting shaft 55 mounted on cover mounting sections 52, 53. On the inner surface of the cover 47, that is on the surface of the lid 54 facing the upper surface of the keyboard cover 51 on closure of the main body 44, there is provided a display section 27 for displaying the information read out from the optical disc 1 as the visual information. The distal edge of the lid 54 is formed with a locking piece 57 engaging in a mating locking portion 56 provided in the main body 44 for locking the lid 54 in the closing position.

On the forward lateral side of the main body 44, there are provided a playback key 58 for designating the reproduction of the audio disc loaded in the disc reproducing apparatus, a fast feed key 59 for designating the forward fast feed, a reverse feed key 60 for designating the reverse fast feed and a power source switch for on/off control of the power source of the apparatus. The playback key 58, fast feed key 59 and the reverse feed key 60 constitute a first operating section which comes into operation when the fast feed mode of the audio disc is selected.

Meanwhile, on the upper surface of the keyboard cover 51, that is on the surface which is exposed to outside when the disc loading section 45 is covered by the keyboard cover 51, there are arrayed, as shown in FIG. 8, a plurality of alphabet keys 61, a cursor shift key 62 constituting a pointing device, a plurality of selection keys 63, 64 for selecting a selection item displayed on the display section 27 and designated by a cursor actuated by the cursor shift key 62, and a plurality of function selection keys 65. These keys provided on the upper surface of the keyboard cover 51 constitute a second operating section that comes into operation on selection of the playback mode of the data disc.

The cursor shift key 62 constituting the positioning device is provided with switches, not shown, in register with indices 62a, 62b, 62c and 62d provided on the surface of the key 62. On thrusting the indices 62a to 62d of the cursor shift key 62, the key 62 is turned in the vertical direction and in the left-and-right direction about the center of the key 62. The switches associated with the indices 62a to 62d of the cursor shift key 62 are operated by thrusting these indices 62a to 62d. By selective thrusting of these switches, the cursor displayed on the display section 27 is shifted so that the display information on the display section 27 as indicated by the cursor is variably designated by the cursor.

Figure 9:
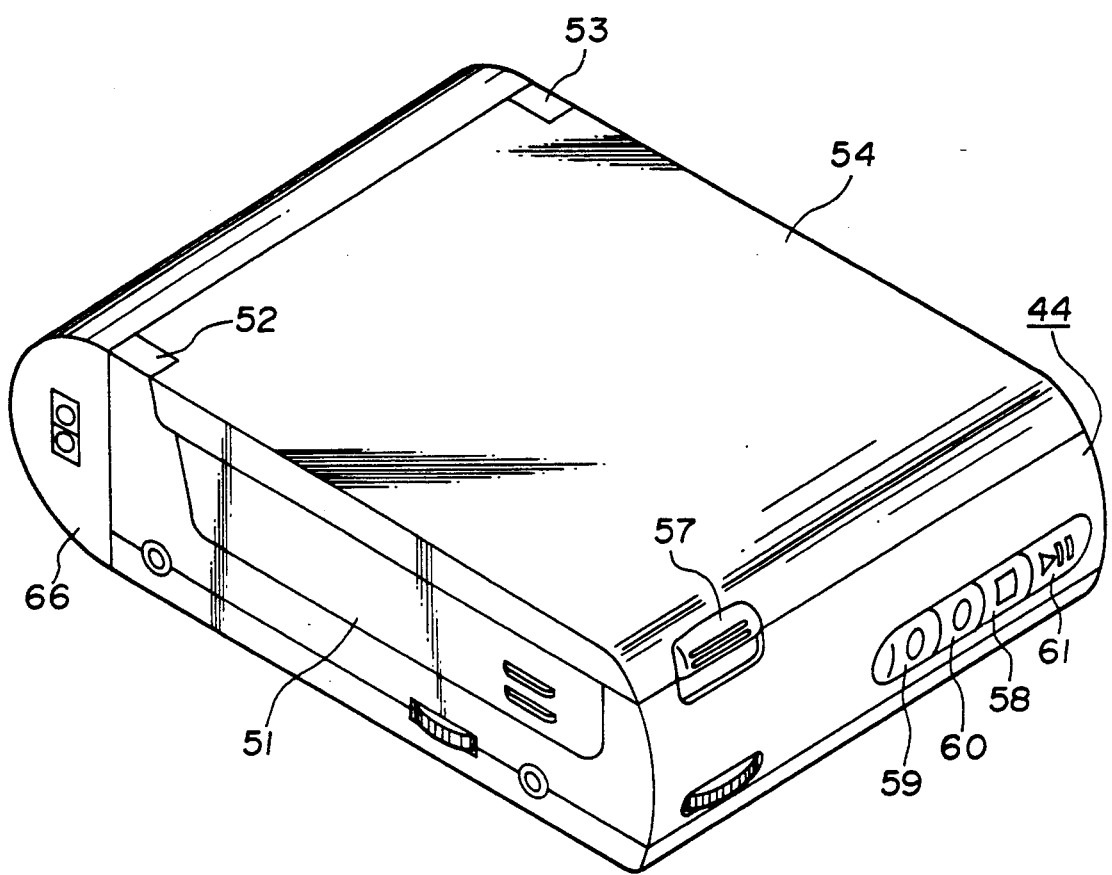
FIG. 9 is a perspective view showing the reproducing apparatus for a disc with a battery box attached thereto.

On the back side of the main body 44, there is detachably mounted a rack of a chargeable battery 66 or a dry cell pack, as shown in FIG. 9.

The operation of discriminating the loaded optical disc 1 in the reproducing apparatus of the present invention is explained with reference to a flowchart shown in FIG. 10

The reproducing apparatus performs an operation of discriminating the type of the loaded disc on the basis of the software program recorded in the ROM 22 and the RAM 23. The type of the disc in its entirety is determined in accordance with the TOC contents in the lower level of the software and, after accessing, the control field of the Q-channel data of the subcoding is used to generate an error code for transmitting the contents of the decision to the upper level.

In the upper layer level, the processing system for data processing, music reproduction or an upper level processing system are merged and a limited access demand is made to the lower level. The signal processing systems in the CD signal processing system are switched as a function of the contents of the returned error codes.

Figure 10:
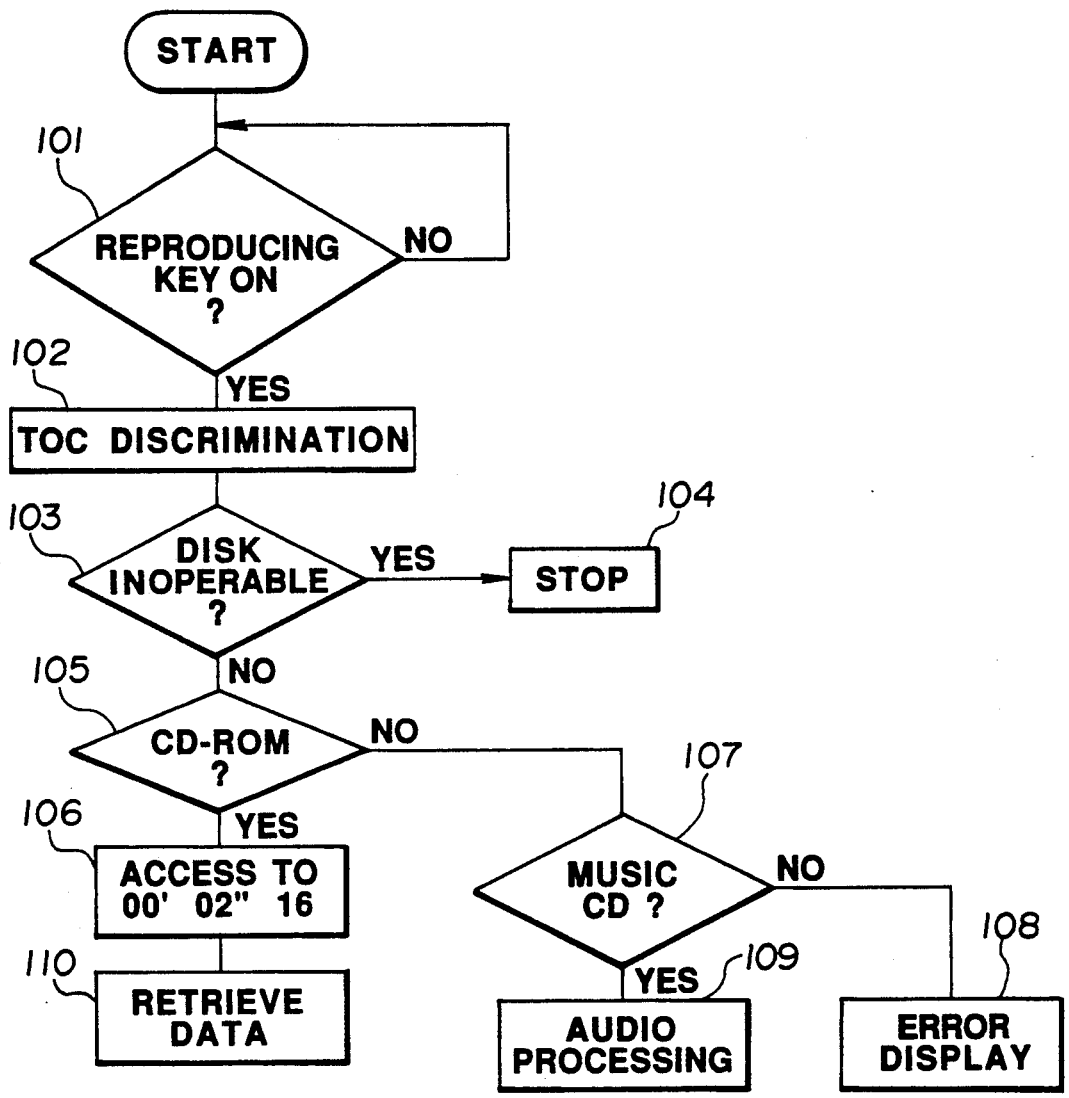
FIG. 10 is a flowchart for illustrating the operation of the reproducing apparatus for a disc according to the present invention.

Referring to FIG. 10, it is determined at step 101 if the disc playback key is turned on. If the result of decision is NO, the step 101 is repeated until the disc playback key is turned on. If the result of decision is YES, the program proceeds to step 102.

At step 102, the control fields A0, A1 of the Q channel and the control fields of the track data indicated by A0 are read in response to the access request from the upper level of the software. If the read-out data is 00**, the disc is determined to be a disc for music (FIG. 5). If at least one of the read-out data is 01*1, the disc is determined to be a data disc, such as an encyclopedia or dictionary. An error code, which represents the contents of discrimination, is returned to the upper level of the software. The program then proceeds to step 103.

Figure 11:
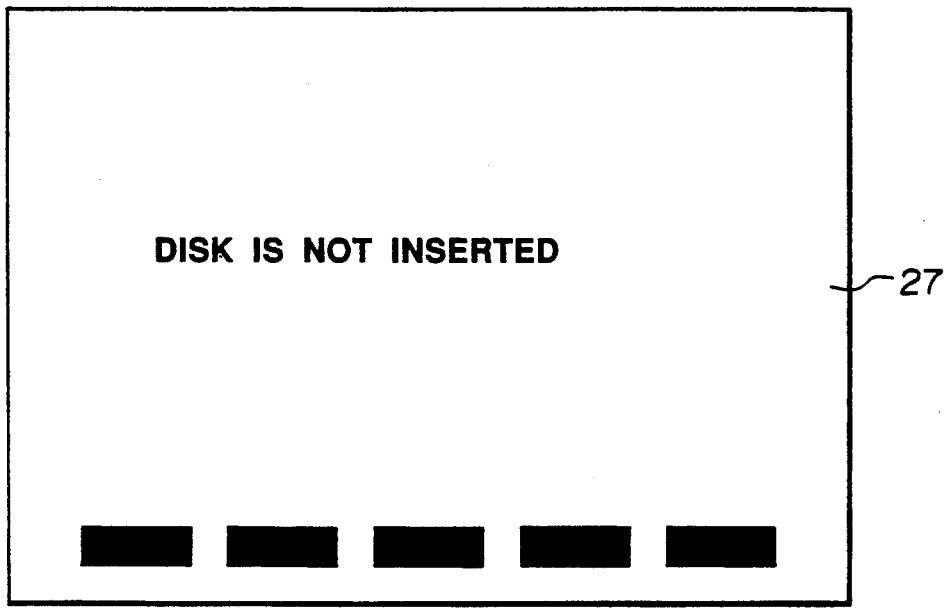
FIGS. 11 to 13 illustrate the display states in the display section.
Figure 12:
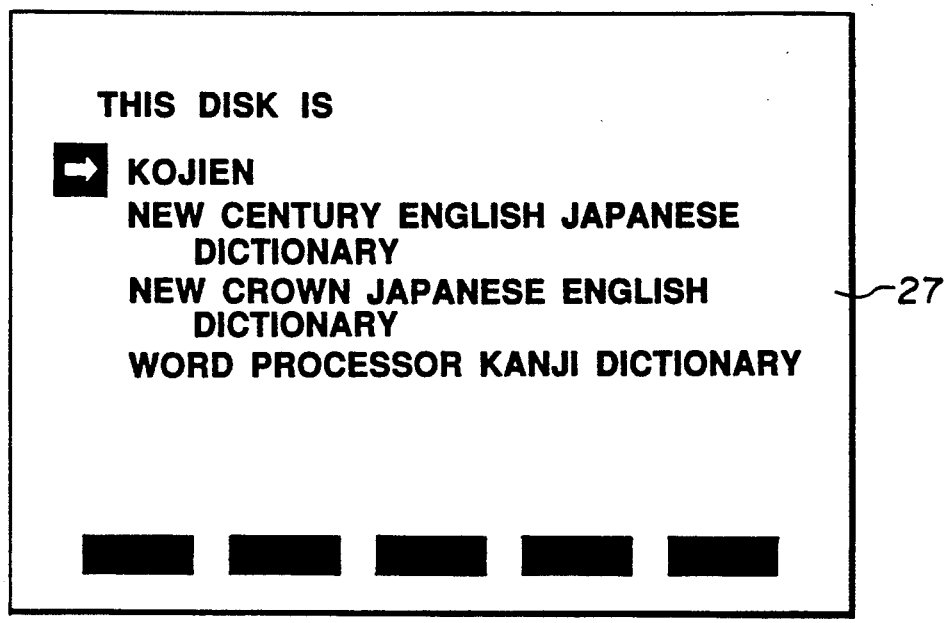
Figure 13:
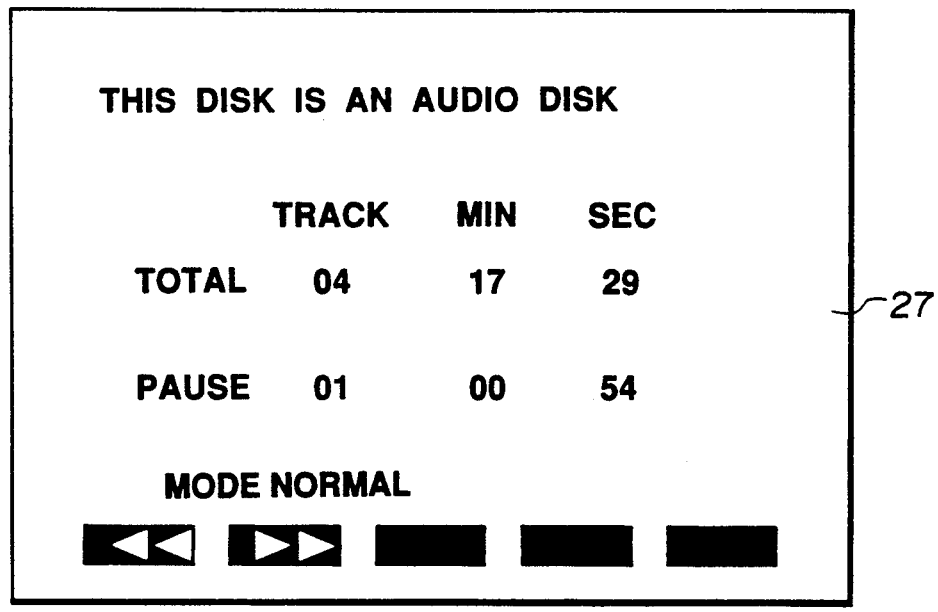

At step 103, it is determined at the upper level if the disc is operatable. If the result of decision is YES, the program proceeds to step 104 where the display "Disc is not inserted" is made on the display section 27, as shown in FIG. 11 and the operation is terminated. If the result is NO, the program proceeds to step 105.

At step 105, it is determined in the upper level if the disc discriminated at step 102 is the data disc. If the result of decision is YES, the program proceeds to step 109 where the display "his Disc is an Audio Disc" is made as shown in FIG. 11. If the result is YES, the program proceeds to step 106 where the display such as "this Disc is a Ko-ji-en" is made on the display section 27 as shown in FIG. 27 for displaying the name or title of the loaded disc. Simultaneously, the signal processing system of the CD signal processing circuit 15 is switched to the system for data disc, while an accessing is made to addresses 00′, 02″ 16 where the contents corresponding to TOC for data disc data are recorded and, after the data of the addresses and read, data retrieving is started. If the result of decision is NO, the program proceeds to step 107.

At step 107, it is determined at the upper level if the load disc is the audio disc. If the result is NO, the program proceeds to step 108 where the display "Disc is not Inserted" is made on the display "Disc is not Inserted" is made on the display screen as shown in FIG. 11. If the result is YES, the program proceeds to 109 where the display concerning the total time and the number of errors is made besides the display "This Disc is an Audio Disc". Simultaneously, the audio processing of switching the signal processing system of the CD signal processing circuit 15 to the system for musical signals is made to terminate the operation.

From the foregoing it is seen that, by reading out the control fields of the control bits A0 and A1 of the Q channel of the TOC data and the control field of the track data indicated by the control bit A0, it may be discriminated if the loaded optical disc is the music disc or the data disc, and that, by automatically switching the signal processing systems responsive thereto, reproduction suited to the disc type may be made even if the user should have loaded the optical disc without being conscious about the type of the disc.

Meanwhile, the above described reproducing apparatus may be usable when the disc loaded therein is of the small memory capacity with, for example, a 20-byte RAM and a 300-byte program, an optical disc conforming to the World Standard Format ISO9600, or a music disc.

The foregoing description has been made of the operation of the simple type discrimination of the disc type. In case of more intensive discrimination, the total contents of the TOC data are read out, it is sufficient if the total control fields are checked as described previously, the continuous regions are stored in the memory and the error code is produced when the region other than the stored region is designated by the type of access demand.

In such case, it is necessary to procure the processing memory capacity of, for example, 600 bytes for HAM and the program of ca. 1.2 kilobytes.

In case of performing the simple type processing and intensive processing, the access instructions are first executed, the control fields are checked for each minimum data unit and, if the data are such that cannot be executed by the current processing, the voice processing is muted and the error code reflecting the contents is generated to enable the above operation to be performed without noise generation.

What is claimed is:

1. A reproducing apparatus for reproducing optical discs having at least two different kinds of recording format types for recording either non-audio, information data or audio data, respectively, the discs further having recorded thereon format type discriminating data, wherein the reproducing apparatus comprises:
   optical reading means for optically reproducing recorded data from an optical disc;
   a first signal processing means for processing reproduced audio data;
   a second signal processing means for processing reproduced information data;
   a main body section;
   discriminating means connected to the optical reading means and supplied with recorded data reproduced from the optical disc for detecting, at the time of star ting the disc reproducing operation, the format type discriminating the format type of the optical disc on the basis of the format type discriminating data, and causing the reproduced recorded data from the optical reading means to be supplied either to the first signal processing means or the second signal processing means depending upon the format type of the optical disc;
   display means having its display contents switched by the discriminating means;
   pointing means for allowing a user of the apparatus to manually position a cursor on the display means;
   central processing means connected to the first signal processing means, the second signal processing means, and the discriminating means for causing, under the control of the discriminating means, either reproduced audio data or information data to be accessible to a user of the reproducing apparatus, and wherein the central processing means further generates display control signals indicating the type of the optical disc on the basis of the format type discrimination data;
   wherein the optical reading means includes an optical pickup and the central processing means causes the optical reading means to shift the optical pickup towards the innermost periphery of the disc at the time of starting a data reproducing operation to read out the format type discrimination data recorded towards an innermost periphery of the disc;
   wherein, when the format type discrimination data indicate that the disc is an information data disc, the central processing means transmits the display control signal before moving the optical pickup to a record start portion of the disc; and
   wherein, when the type discriminating data indicate that the disc is an optical disc on which audio data are recorded, the central processing means outputs a record time signal, in addition to the display control signals, indicating a total record time of audio data programs on the disc.

2. The reproducing apparatus according to claim 1, wherein the display means causes data concerning the type of the disc discriminated by the discriminating means to be displayed and further wherein the display means receives and displays the record time signal.

3. The reproducing apparatus according to claim 2 wherein, with the reproducing means switched to the audio signal reproducing operation by the discriminating means, at least one reproducing mode other than an ordinary reproducing mode is displayed on the display means in addition to at least the total record time and wherein the reproducing mode is switched responsive thereto by one of the first and second processing means.

4. The reproducing apparatus according to claim 1, wherein the pointing means is provided on the surface of the main body section.

5. The reproducing apparatus according to claim 1, wherein the pointing means is provided on the surface of the main body section along with a plurality of selection switches.

6. The reproducing apparatus according to claim 1, wherein the display means is rotatably mounted relative to the main body section.

7. The reproducing apparatus according to claim 1 which is of a size capable of reproducing an optical disc about 80 mm in diameter and which is 105 mm in width, 135 mm in depth, and 45 mm in height.

8. A reproducing apparatus according to claim 1, wherein the optical discs of both formats have recorded thereon table of contents ("TOC") data including data of a Q-channel, the data of the Q-channel including control fields, and wherein the format type discriminating data is included in the control fields of the Q-channel data.

9. A reproducing apparatus according to claim 8, wherein control fields of the Q-channel data include a four bit control field A0 and wherein if the discriminating means determines that the bits of the control field A0 are 00**, the disc is determined to be of the audio data format type whereas if the bits of the control field A0 are 01*1, the disc is determined to be of the information data format type, where "*" indicates either a 0 or a 1.

10. A reproducing apparatus for reproducing optical discs having at least two different kinds of recording format types for recording either non-audio, information data or audio information data, respectively, the discs further having recorded thereon format type discriminating data, wherein the reproducing apparatus comprises:

optical reading means for optically reproducing recorded data from an optical disc;

a first input means for inputting commands by a user of the reproducing apparatus when the optical disc records audio information data;

a second input means for inputting commands by the user of the reproducing apparatus when the optical disc records non-audio information data;

a first signal processing means for processing reproduced audio information data;

a second signal processing means for processing reproduced non-audio information data;

discriminating means connected to the optical reading means and supplied with recorded data reproduced from the optical disc for detecting, at the time of starting the disc reproducing operation, the format type discriminating data recorded on the disc, discriminating the format type of the optical disc on the basis of the format type discriminating data, and causing the reproduced recorded data from the optical reading means to be supplied either to the first signal processing means or the second signal processing means depending upon the format type of the optical disc;

central processing means connected to the first signal processing means, the second signal processing means, the first input means, the second input means, and the discriminating means for causing, under the control of the discriminating means, either reproduced audio information data or non-audio information data to be accessible to a user of the reproducing apparatus, and wherein the central processing means further generates display control signals indicating the type of the optical disc on the basis of the format type discrimination data and a control signal for enabling one of the first input means and the second input means according to the format type discriminating data;

wherein the optical reading means includes an optical pickup and the central processing means causes the optical reading means to shift the optical pickup towards the innermost periphery of the disc at the time of starting a data reproducing operation to read out the format type discrimination data recorded towards an innermost periphery of the disc;

wherein, when the format type discrimination data indicate that the disc is an non-audio information data disc, the central processing means transmits the display control signal before moving the optical pickup to a record start portion of the disc; and wherein, when the type discriminating data indicate that the disc is an optical disc on which audio information data are recorded, the central processing means outputs a record time signal, in addition to the display control signals, indicating a total record time of audio information data programs on the disc.

* * * * *